United States Patent [19]

Pickett et al.

[11] Patent Number: 4,497,264

[45] Date of Patent: Feb. 5, 1985

[54] COMBINATION SEEDER AND FERTILIZER DISPENSER FOR HOME VEGETABLE GARDENS

[75] Inventors: Kenneth J. Pickett, Mishawaka; Carl B. Derr, Bristol, both of Ind.

[73] Assignee: Earthway Products, Inc., Bristol, Ind.

[21] Appl. No.: 439,355

[22] Filed: Nov. 4, 1982

[51] Int. Cl.³ .............................................. A01C 5/06
[52] U.S. Cl. ..................................................... 111/73
[58] Field of Search ................................... 111/70-73, 111/82, 85, 4, 79-81, 35

[56] References Cited

U.S. PATENT DOCUMENTS

| | | | |
|---|---|---|---|
| 140,254 | 6/1873 | DeVany | 111/72 |
| 307,015 | 8/1884 | Chapuis | 111/73 X |
| 597,485 | 1/1889 | Beall | 111/73 X |
| 2,371,958 | 7/1943 | Douthitt | 111/72 |
| 3,774,557 | 11/1973 | Esmay | 111/82 |

Primary Examiner—Robert A. Hafer
Assistant Examiner—Danton DeMille
Attorney, Agent, or Firm—Russell E. Hattis

[57] ABSTRACT

There is combined with a hand pushable seeder of a type with a pair of wheels and an adjustable furrow-forming ground opener means disposed to traverse only a single common dispensing track aligned therewith a side dressing fertilizer dispenser with its own fertilizer-receiving hopper attached upon the frame of the seeder so that a fertilizer dispensing chute of the hopper is disposed to dispense the fertilizer behind the ground opener and along the single common track traversed by the wheels propelled alongside can thus dispense fertilizer alongside young growing plants germinating from seeds dispensed by the same seeder many weeks before.

15 Claims, 10 Drawing Figures

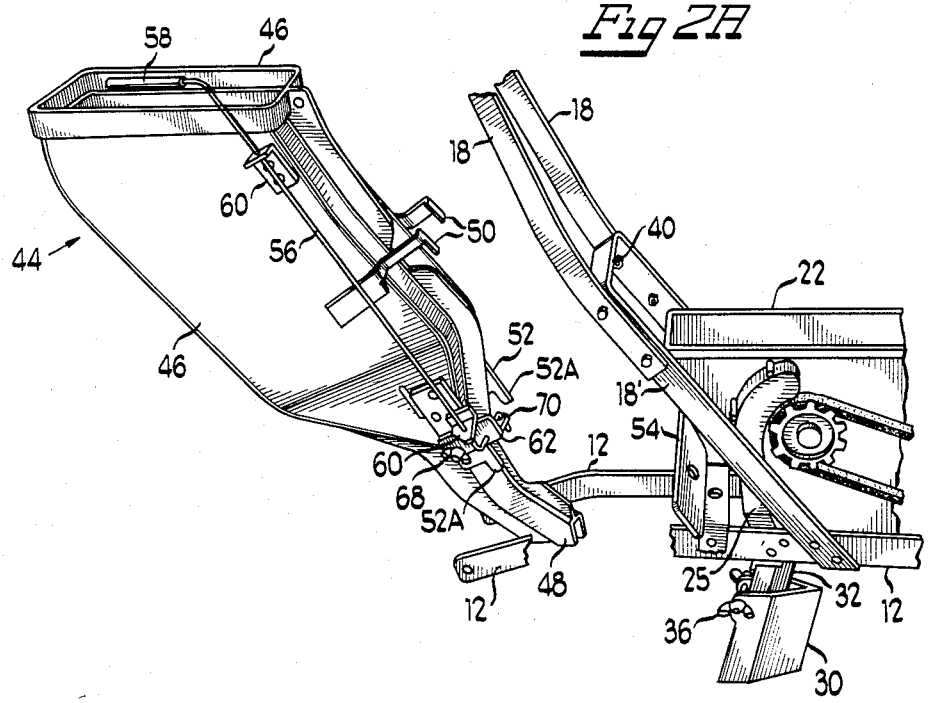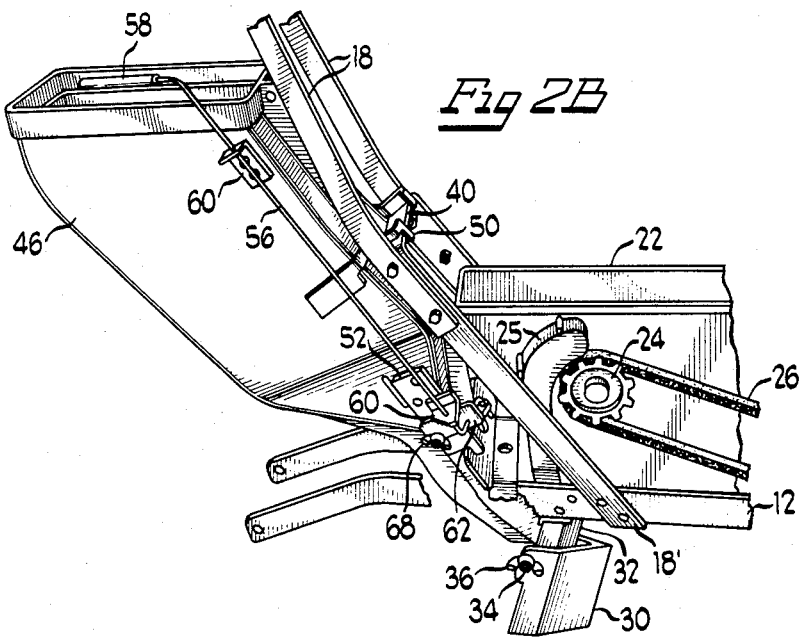

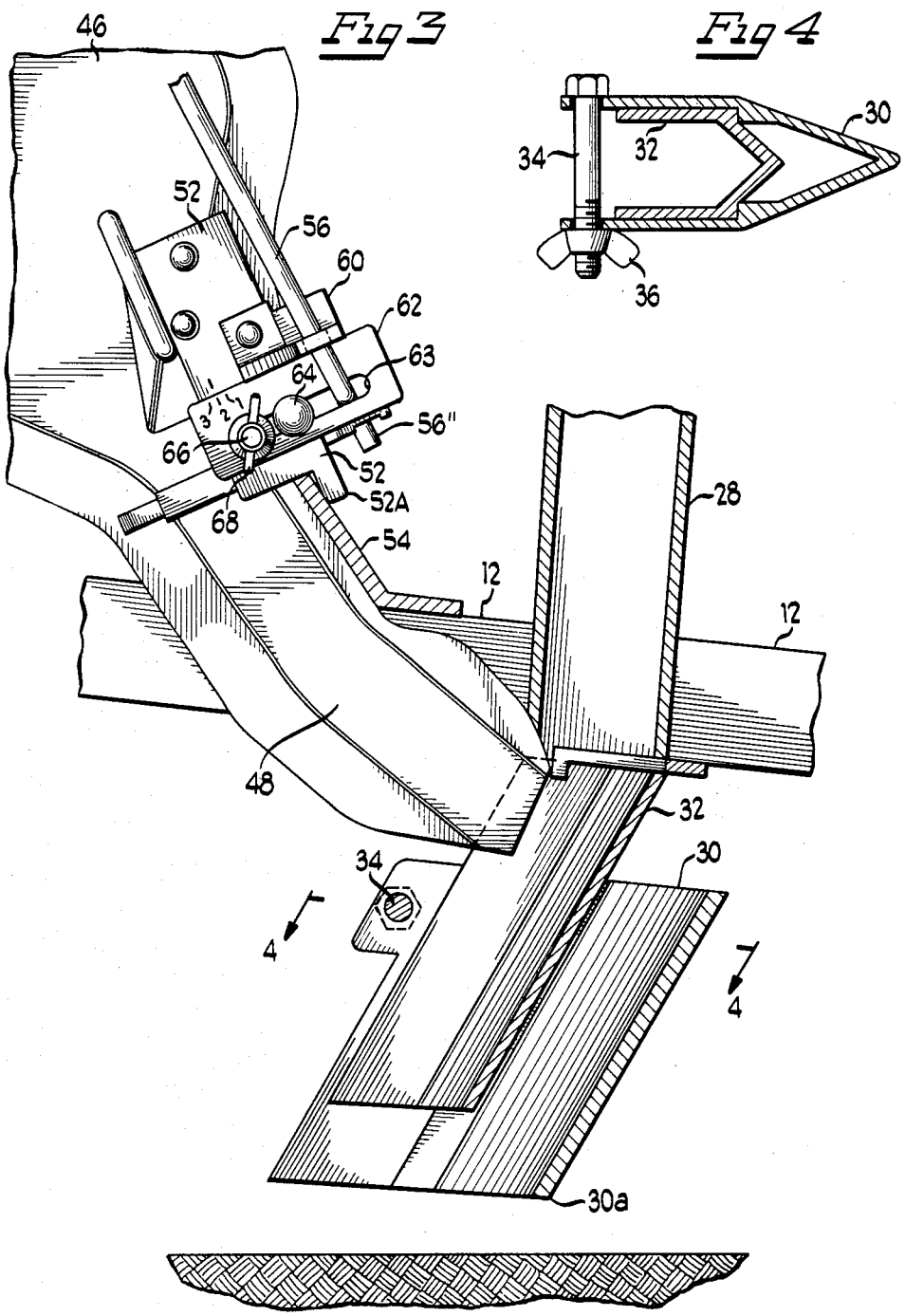

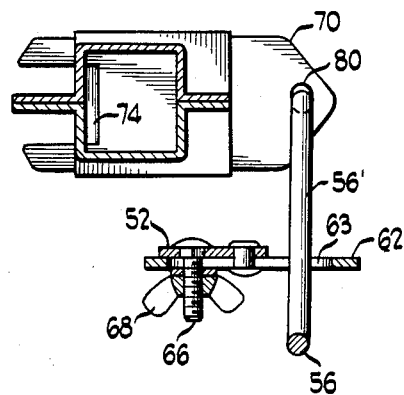
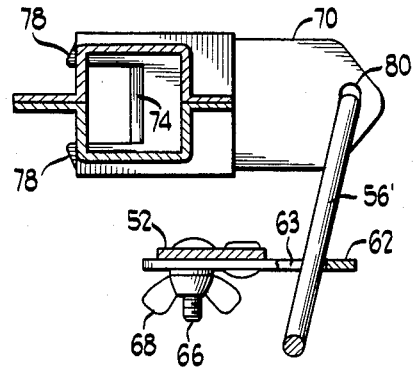
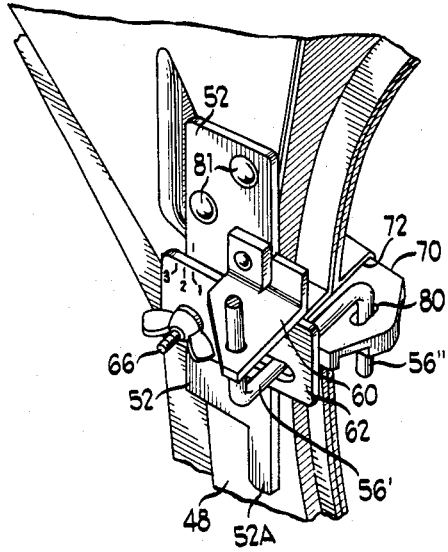
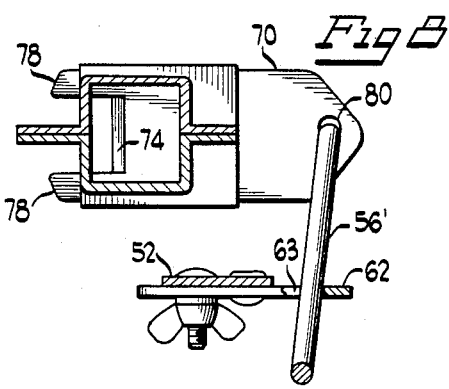
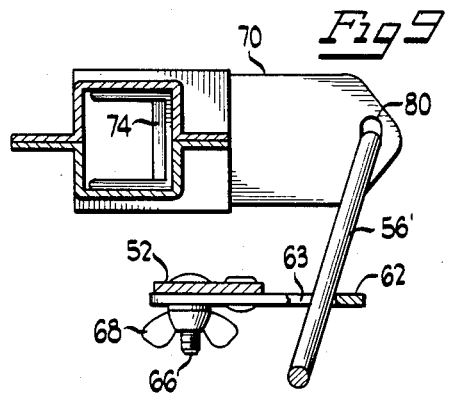

COMBINATION SEEDER AND FERTILIZER DISPENSER FOR HOME VEGETABLE GARDENS

TECHNICAL FIELD OF THE INVENTION

The invention relates to improvements in dry fertilizer dispensing apparatus, and, in particular, to fertilizer apparatus for side dressing plants with fertilizer.

BACKGROUND PRIOR ART

There has not been much attention given to the development of portable, hand pushable fertilizer dispensers for home vegetable gardens. Such dispensers ideally should dispense fertilizer along a track immediately alongside plants when they are only a few inches tall. Hand pushable seeders for home gardens have been developed (see for example U.S. Pat. No. 3,774,557, issued to Esmay et al), but such seeders have not been suitable for dispensing granular fertilizers, because the chemical and physical characteristics of seeds are so different from the granular fertilizer that apparatus suitable for seed dispensing is generally unsuitable for granular fertilizer dispensing. Thus, seeders require metered apparatus that drop seeds of a given size at a substantial preset interval along the ground depending upon the seed size and type, while fertilizer apparatus requires metering apparatus suitable for the granular fertilizer grains and generally for much greater dispensing rates than are suitable for seeds. Moreover, many of the fertilizers commonly in use are chemically corrosive to the materials out of which the interior parts of seed dispensers are made. A combination seeder-fertilizer unit which features a fertilizer dispenser and a seed dispenser on a common frame and which requires simultaneous seed and fertilizer dispensing is commericially available (Model 9000B, manufactured by Earthway Products, Inc., of Bristol, Ind.). It basically comprises two completely independent units on a common frame having aligned wheels between which a furrow digger and seed dispenser are located, and a fertilizer dispenser located laterally to one side of the wheels for fertilizer side dressing. The wheel location prohibits side dressing after the seeds have germinated into young plants since the wheels which roll along the seeding path would damage the growing plants if the apparatus were to be used after the seeds had germinated into young plants.

SUMMARY OF THE INVENTION

It has not heretofore been proposed, as in the present invention, to utilize a seeder like that disclosed in U.S. Pat. No. 3,774,557 as a carrier for a fertilizer dispensing attachment, which converts the seeder to a fertilizer dispensing system at minimum cost to the owner of such a seeder, and wherein the resulting combination seeder and fertilizer dispensing unit is used only as a side dressing fertilizer unit propelled alongside the young plants where the wheels do not damage the same.

The seeder disclosed in U.S. Pat. No. 3,774,557 comprises a frame including operating handle grips on an upstanding portion of the frame, a seed hopper for holding a quantity of seed to be dispensed attached to and carried by a lower portion of the frame, and preferably only front and rear wheels attached to the lower portion of the frame for supporting the seeder for rolling movement over only a single track defining the seeding path. Supported between the front and rear wheels from the lower portion of the frame is an adjustable ground opening means which adjusts the depth of a furrow formed thereby. The seed hopper includes means for directing seeds from the hopper upon the ground along the line of traverse of the wheels of the seeder and behind the front portion of the ground opening means which digs into the earth to form the furrow. Although various ground opening designs can be used, it is most preferred, as disclosed in this patent, to utilize a ground opening means having a configuration whereby seeds from the seed hopper and dispensed into an interior portion of the ground opening means behind the front furrow digging portion thereof, the side portions of the ground opening means being shaped so that as the seeds are deposited in the furrow, most of the loosened dug-up earth falls back onto the seeds in the furrow formed by the front portion of the ground opening means. The remaining loosened earth is smoothed over the furrow by means of a trailing chain which pushes and smooths the loosened earth over the almost filled furrow.

In accordance with the present invention, a fertilizer dispenser attachment is designed to be attached to the frame of the seeder, the dispenser attachment including a fertilizer hopper for holding a quantity of fertilizer to be dispensed and a fertilizer dispensing chute communicating with an exit orifice disposed on the lower portion of the hopper, the dispensing chute oriented to drop the fertilizer dispensed from the hopper. There are provided means for mounting the fertilizer dispenser attachment on the frame of the seeder so that the fertilizer dispensing chute thereof is disposed to dispense the fertilizer behind the front ground-digging portion of the ground opening means of the seeder, so that the fertilizer is dropped on the track along which the seeder wheels are rolled upon the ground, which is alongside the young plants formed from the same seeds dispensed by the seeder many weeks before. The same ground opening means used for seeding is adjusted to dig a furrow of the proper depth for the fertilizer. This furrow is covered over with earth in the same way that the earth filled the furrow in which the seeds were dropped. It is apparent that one who has purchased the seeder disclosed in the patent referred to can convert the seeder to a fertilizer dispenser by purchasing the dispensing unit of the invention and, after the seeder has been used to dispense seeds which germinate and grow into young plants, by attaching the fertilizer dispensing attachment upon the seeder to convert the seeder into a fertilizer dispensing unit, using the seeder ground opening means and wheel supported frame to complete an operable hand pushable fertilizer dispensing unit.

Other features of the invention deal with the specific manner in which the hopper is designed to be mounted upon the seeder, and a unique fertilizer metering means which is adjustable to vary the quantity of fertilizer dispensed from the hopper.

The above and other advantages and features of the invention will become apparent by making reference to the specification to follow the claims and the drawings.

BRIEF DESCRIPTION OF DRAWINGS

FIG. 2A is an exploded perspective view of a portion of the seeder of FIG. 1 and the fertilizer dispenser attachment of the present invention, showing the dispenser attachment in position to be connected to the portions of the seeder identified by dashed lines;

FIG. 2B is a perspective view of the apparatus shown in FIG. 2A with the fertilizer dispenser attachment mounted on the seeder;

FIG. 3 is a partially sectioned side elevation of the combined fertilizer and seeder unit in the region of the lower fertilizer metering portion of the fertilizer hopper and the adjusted ground opener of the seeder also used during dispensing of the fertilizer;

FIG. 4 is a partially sectioned plan view of the seeder ground opener, showing its engagement with a ground opener guide;

FIG. 5 is a perspective view of the fertilizer metering apparatus of the fertilizer dispenser attachment; and FIGS. 6-9 are partially sectioned plan views of a fertilizer dispensing chute at the bottom of the fertilizer hopper of the fertilizer attachment and of an adjustable limit plate for controlling the size of the chute fertilizer dispensing aperture.

DETAILED DESCRIPTION OF THE EXEMPLARY FORM OF INVENTION SHOWN IN DRAWINGS

Figure 1:
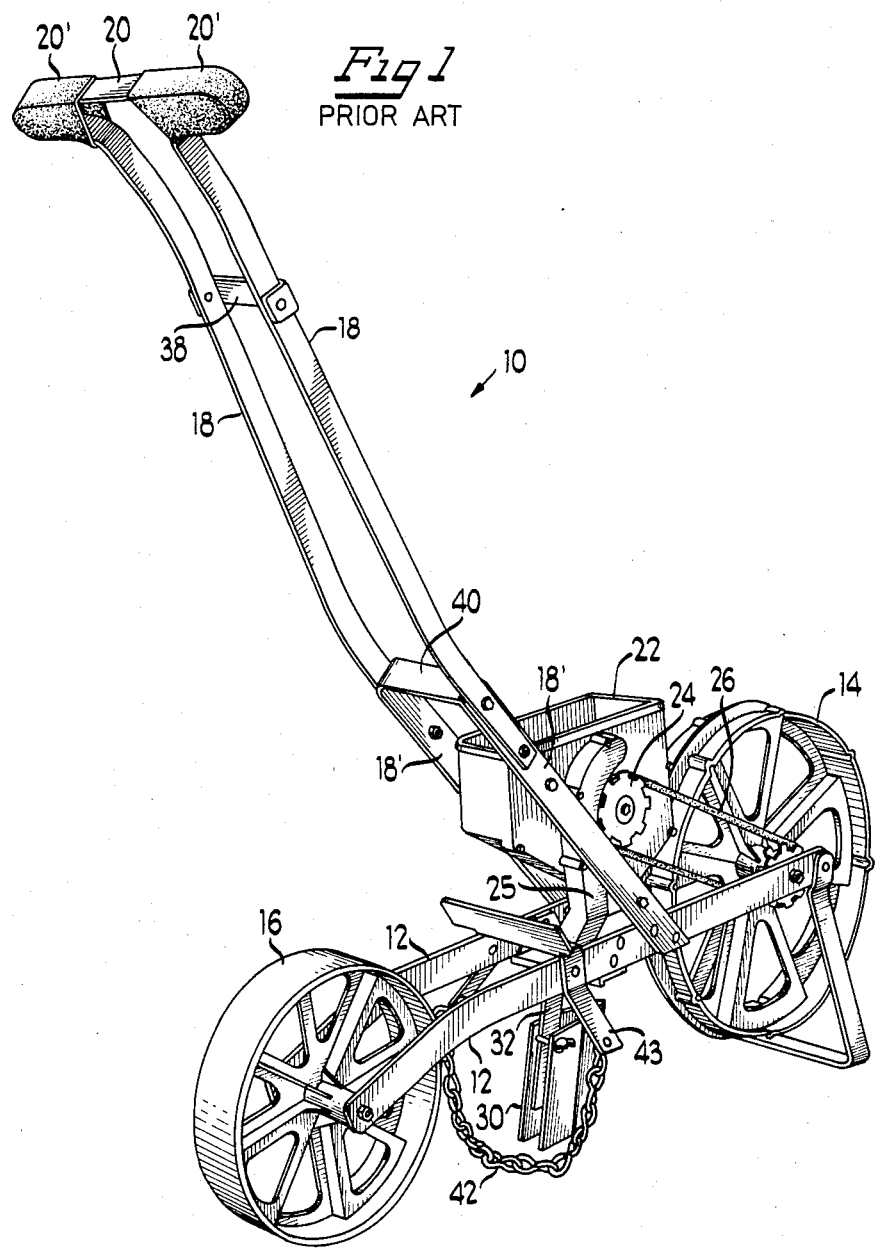
FIG. 1 is a rear perspective view of a two-wheeled seeder to which the fertilizer dispenser attachment of the invention shown in FIGS. 2 is designed to be attached.

The exemplary form of the invention shown in the drawings is a granulated fertilizer dispensing apparatus for use as an accessory to a preferably two wheeled seeder of the general type disclosed in U.S. Pat. No. 3,774,557, issued to Esmay et al on Nov. 27, 1973, this patent being incorporated herein by reference. FIG. 1 thereof shows such a seeder. The seeder 10 includes a pair of laterally spaced, confronting, horizontally extending, parallel, frame elements 12—12 forming a lower wheel carrying portion of a seeder frame. A front support wheel 14 and a rear support wheel 16 are attached to the front and rear of the frame elements. A pair of laterally confronting handle grip-carrying bars 18—18 forming the upper portion of the seeder frame are attached to upstanding side frame members 18'—18' connected to the frame elements 12—12 between the ends thereof. The upstanding side frame members 18'—18' are joined by a crossmember 40 to which a part of the fertilizer dispenser is to be attached. Handle grips 20 are formed by curved portions of the bars 18—18 and are covered by handle covers 20'—20'.

A seed hopper 22 attached to the seeder frame is open at the top to receive a quantity of seed to be dispensed. The rate of dispensing of the seed is controlled by an adjustable dispensing means (not shown) inside the seed hopper 22 and adjusted by metering means 24 rotationally driven by means of a metering system drive belt 26 engaged to be driven by the front support wheel 14. As the seeder 10 is driven over the ground, the metering means drops seeds at a pre-set rate through a seed directing means shown as a seed dispensing chute 25, the chute being aligned to dispense seeds between the front and rear wheels 14 and 16. A flat-bottomed ground opener 30 of generally triangular shape is mounted upon a rearwardly open ground opener guide 32, configured in prolongation of the seed dispensing chute 25 (see also FIG. 3), and is adjustable in height by means of a ground opener locking bolt 34 and a locking wing nut 36. The seed dispensing chute 25 extends into the upper end of the ground opener which has a ground digging front edge 30a which opens the ground in front of the chute 25. The chute 25 drops the seeds immediately behind the ground digging edge 30a of the ground opener. The sides of the ground opener 30 are designed so that loosened earth immediately drops back onto the furrow formed thereby to cover the seeds and at least partially fill the furrow. By selectively positioning the height of the ground opener, the desired depth of a furrow for the seed planting operation is established.

Referring to FIG. 1, it will be apparent that a clear view into the rear of the seed dispensing chute is available to the operator, with the result that he can see that the seeds are being properly dispensed, and will be immediately be alerted in the case that the hopper 22 should become empty or in case of a malfunction of the metering system. FIG. 4 shows details of the engagement of the ground opener 30 with the guide 32. Tightening the wing nut 36 tensions bolt 34 passing through both faces of the ground opener 30 to clamp it to the guide. A drag chain 42 attached to frame outriggers 43 serves to push remaining loose earth onto the almost re-filled furrow.

A laterally extending accessory plate crossmember 54 is provided for bolting accessories to the frame of the planter 10, as for example an outrigger indexing scribe serving as a row marker of the type described in the before referenced Esmay patent.

The subject matter of the present invention will now be described in detail. It is a fertilizer dispenser attachment 44 selectively mountable on the two-wheel seeder just described, so that the user has the option of either fertilizer side dressing (i.e. dispensing the fertilizer to one side of the already growing plants) with the attachment mounted on the planter, or seeding with the attachment 44 removed from the planter. Although the particular fertilizer dispenser attachment shown in the drawings is designed to be mounted on the particular seeder shown in the Esmay patent, the attachment could be re-designed to fit other seeders.

FIG. 2B shows the fertilizer dispenser attachment 44 mounted on the seeder 10. FIG. 2A shows the mounting sequence for the fertilizer dispenser attachment 44.

The fertilizer dispenser attachment 44 includes a hopper 46 for dispensing a quantity of granular fertilizer. Projecting downward and rearwardly from the hopper is a fertilizer dispensing chute 48 which preferably is positioned to extend into the upper portion of the seed dispensing chute 25 of the seeder 10 located within the interior of the ground opener 30 when the attachment is mounted on the seeder. The chute 48 serves to guide the fertilizer from the hopper 46 to the seed dispensing chute where the fertilizer drops upon the ground directly behind the ground digging front edge 30a of the ground opener 30 when the ground opener is of the type described which permits the dug-up earth to fall back into the furrow. Because the rearwardly open bottom portion of the ground opener is visible to the user as he pushes the seeder 10 converted into a fertilizer device, the user can see whether or not the fertilizer is in fact being dispensed as he could see the seeds dispensed from the same point on the seeder.

The fertilizer hopper 46 has upper mounting means, preferably a pair of forwardly projecting resilient mounting clips 50 having shank portions adapted when pushed toward one another to fit between the seeder frame bars 18—18. The clips have depending extensions 50a—50a which lock over the frame crossmember 40. The fertilizer hopper has lower mounting means, preferably in the form of a pair of forwardly projecting hook-shaped mounting members 52—52 having depending fingers 52a—52a which lockingly engage over the laterally extending accessory plate 54 to provide secure engagement of the dispenser attachment 44 to the frame elements of the seeder.

As in the case of the seeding operation, the ground opener 30 may be set at a variety of heights, including a fully retracted position wherein the fertilizer is dispensed to lie on the surface of the ground or an extended position where a furrow is formed for the fertilizer.

FIGS. 2A and 2B are fragmentary views of the seedeer 20 of FIG. 1 showing the fertilizer dispenser attachment mounted on the seeder frame as just described. As the seeder 12 is propelled over the ground, the rate at which fertilizer is dispensed from the hopper 46 is governed by actuation of a dispenser control handle 58 which serves to rotate a dispenser actuating rod 56 carried by a pair of vertically spaced rod guides 60, and having an end portion 56" engaging a dispenser slide 72 to withdraw the slide to open the passageway between the hopper 46 and the dispenser chute 48. It will be noted in the exemplary form shown in FIG. 5 that the lower mounting members 52 are planar members secured by rivets 81—81 to the opposite lateral walls of the hopper 46. The lower rod guide 60 is secured to one of the mounting members 52.

FIGS. 5-9 show details of the actuation of the metering system. The dispensing slide 70 fits into a slide well 72, the slide being freely movable therein from a closed position to a fully extended position wherein the passage therethrough is fully open to allow the passage of the fertilizer. FIG. 6 shows the slide 70 fully inserted to cut off the flow. Slide extensions 78 extend through closely fitting passages (not shown) in the chute wall to assist in guiding the slide 70. A beveled leading knifelike slide edge 74 is provided to insure proper closure of the slide 70 into the slide well 72, the sharp edge serving to cut through the grains of fertilizer to insure proper closure.

The actuating rod has an offset portion including an offset end portion 56" parallel to the actuating rod 56 and an intermediate portion 56' laterally extending from the main portion of the rod. The end portion 56" passes through a slot 80 located in the outer end of the slide 70 and having its axis aligned laterally perpendicular thereto, so that there is provided a loose accommodating engagement of the end portion with the slide whereby rotation of the actuating rod main portion 56 causes the slide to translate back and forth to adjust the flow through the chute.

Adjustable slide withdrawal limiting means are provided in the exemplary form by an adjustable limit plate 62 slidably mounted on a guide pin 62 shown in the form of a rivet and secured to the lower mounting member 52 to which guide rod 60 is anchored. The plate 62 has a slot 63 therein which sets the position at which the control rod 56 strikes the defining wall at the end of the slot 63, thereby setting the maximum extension of the dispenser slide 70. Thus, the maximum degree to which the passage between the hopper 46 and the dispensing chute 48 is opened is preset by the operator according to the chosen rate at which he wishes to dispense the fertilizer. FIGS. 7-9 show the slide 70 fully retracted to various positions as established by the setting of the limit plate 62. A wing nut 68 threads over a bolt 66 also passing through the slot 63 to clamp the limit plate in an adjusted position.

Although a variety of materials may be used in the construction of the fertilizer dispenser 44, in the preferred form of the invention, the hopper 46 and dispensing chute 48 are of a one piece molded construction and made of a high impact polystyrene. All metal parts which are contacted by fertilizer, such as the rivet fastening attachments for the control rods 56, etc. are made of a non-corrosive aluminum which is not attacked by the fertilizer chemicals. Since some fertilizers have a mild corrosive effect on certain metals, in the preferred form of the invention, the dispenser slide 70 is made of a commercial high strength synthetic plastic material.

A fertilizer dispenser with internal metering feature has been described. It is particularly suited as an accessory to a two-wheeled seed planter as described having a rearwardly open seed dispensing chute between and aligned with the front and rear wheels thereof. Because of the alignment of the fertilizer dispensing chute 48 with respect to the front and rear wheels, the fertilizer attachment is used for side dress fertilizing where the planter wheels are directed to one side of the young growing plants formed from the seeds planted by the seeder 10 many weeks earlier. The rearwardly open ground opener enables the user to see easily along side the fertilizer dropping toward the ground. A substantial convenience and cost economy is thereby secured to the operator, since by the addition of the attachment of the invention, the two-wheeled seeder becomes a fertilizer dispenser as well, and the ground opening and ground closing means of the seeder can be used to assist in the application of the fertilizer.

We claim:

1. In combination, a seeder comprising a frame including upper and lower frame portions, said upper portion of said frame including a pair of laterally spaced upwardly extending frame-forming means having handle grips at their uppr ends, and there being therebetween a crossmember below said handle grips, a seed hopper on said frame for holding a quantity of seed to be dispensed, wheel means attached to a lower portion of said frame for supporting said frame as it is propelled over the ground by an operator, ground opening means on the lower portion of said frame and having a ground digging means for opening a furrow in the ground, said ground opening means having adjustment means for setting the cutting depth of said ground opening means to a chosen value, and seed directing means for directing the flow of seeds to the ground behind said ground digging means, said wheel means and said ground opening mans being disposed to traverse only a single common track aligned therewith as said seeder is propelled over the ground; and a fertilizer dispenser attachable upon said frame and comprising: a fertilizer hopper for holding a quantity of fertilizer to be dispensed, a fertilizer dispensing chute having fertilizer directing means positioned to drop the fertilizer from the hopper at a given point, manually controllable metering means for regulating the rate of flow of said fertilizer out of said dispensing chute, and mounting means for mounting said fertilizer dispenser on said frame of said seeder so that said dispensing chute is disposed to dispense said fertilizer behind said front ground digging means of said ground opening means and along said single common track, so that said fertilizer dispenser when attached to said seeder dispenses fertilizer alongside growing plants as said wheel means is propelled alongside said plants, said mounting means comprising upper mounting means for removably attaching said fertilizer hopper to an upper portion of said frame, and lower mounting means for removably attaching said fertilizer hopper to said lower portion of said frame, said lower portion of said frame including a laterally extending member, said lower mounting means engaging with said laterally extending member, said upper mounting means including a pair of forwardly and downwardly extending spring clips extending forwardly from said fertilizer hopper and configured for lateral springout engagement with the interior surfaces of said upwardly extending frame-forming means when insertingly pressed therebetween, said clips having depending fingers configured to engage over said crossmember when pressed downward thereagainst.

2. In combination, a seeder comprising a frame including upper and lower frame portions, operator handle grips on said upper portion of said frame, a seed hopper on said frame for holding a quantity of seed to be dispensed, wheel means attached to a lower portion of said frame for supporting said frame as it is propelled over the ground by an operator, ground opening means on the lower portion of said frame and having a ground digging means for opening a furrow in the ground, said ground opening means having adjustment means for setting the cutting depth of said ground opening means to a chosen value, and seed directing means for directing the flow of seeds to the ground behind said ground digging means, said wheel means and said ground opening means being disposed to traverse only a single common track aligned therewith as said seeder is propelled over the ground; and a fertilizer dispenser attachable upon said frame and comprising: a fertilizer hopper for holding a quantity of fertilizer to be dispensed, a fertilizer dispensing chute having fertilizer directing means positioned to drop the fertilizer from the hopper at a given point, manually controllable metering means for regulating the rate of flow of said fertilizer out of said dispensing chute, and mounting means for mounting said fertilizer dispenser on said frame of said seeder so that said dispensing chute is disposed to dispense said fertilizer behind said front ground digging means of said ground opening means and along said single common track, so that said fertilizer dispenser when attached to said seeder dispenses fertilizer alongside growing plants as said wheel means is propelled alongside said plants, said mounting means comprising upper mounting means for removably attaching said fertilizer hopper to an upper portion of said frame, and said lower portion of said frame including a laterally extending member, and said lower mounting means including depending fingers which engage over said laterally extending member.

3. In combination, a seeder comprising a frame including upper and lower frame portions, said upper portion of said frame including a pair of laterally spaced upwardly extending frame-forming means having handle grips at their upper ends, and there being therebetween a crossmember below said handle grips, a seed hopper on said frame for holding a quantity of seed to be dispensed, wheel means attached to a lower portion of said frame for supporting said frame as it is propelled over the ground by an operator, ground opening means on the lower portion of said frame and having a ground digging means for opening a furrow in the ground, said ground opening means having adjustment means for setting the cutting depth of said ground opening means to a chosen value, and seed directing means for directing the flow of seeds to the ground behind said ground digging means, said wheel means and said ground opening means being disposed to traverse only a single common track aligned therewith as said seeder is propelled over the ground; a fertilizer dispenser attachable upon said frame and comprising: a fertilizer hopper for holding a quantity of fertilizer to be dispensed, a fertilizer dispensing chute having fertilizer directing means positioned to drop the fertilizer from the hopper at a given point, manually controllable metering means for regulating the rate of flow of said fertilizer out of said dispensing chute, and mounting means for mounting said fertilizer dispenser on said frame of said seeder so that said dispensing chute is disposed to dispence said fertilizer behind said front ground digging means of said ground opening means and along said single common track, so that said fertilizer dispenser when attached to said seeder dispenses fertilizer alongside growing plants as said wheel means is propelled alongside said plants, said mounting means comprising upper mounting means for removably attaching said fertilizer hopper to an upper portion of said frame, said upper mounting means including a pair of forwardly and downwardly extending spring clips extending forwardly from said fertilizer hopper and configured for lateral springout engagement with the interior surfaces of said upwardly extending frame-forming means when insertingly pressed therebetween, said clips having depending fingers configured to engage over said crossmember when pressed downward thereagainst.

4. In combination, a seeder comprising a frame including upper and lower frame portions, said upper portion of said frame including a pair of laterally spaced upwardly extending frame-forming means having handle grips at their upper ends, and there being therebetween a crossmember below said handle grips, a seed hopper on said frame for holding a quantity of seed to be dispensed, wheel means attached to a lower portion of said frame for supporting said frame as it is propelled over the ground by an operator, ground opening means on the lower portion of said frame and having a ground digging means for opening a furrow in the ground, said ground opening means having adjustment means for setting the cutting depth of said ground opening means to a chosen value, and seed directing means for directing the flow of seeds to the ground behind said ground digging means, said wheel means and said ground opening means being disposed to traverse only a single common track aligned therewith as said seeder is propelled over the ground; a fertilizer dispenser attachable upon said frame and comprising: a fertilizer hopper for holding a quantity of fertilizer to be dispensed, a fertilizer dispensing chute having fertilizer directing means positioned to drop the fertilizer from the hopper at a given point; manually controllable metering means for regulating the rate of flow of said fertilizer out of said dispensing chute, and mounting means for mounting said fertilizer dispenser on said frame of said seeder so that said dispensing chute is disposed to dispense said fertilizer behind said front ground digging means of said ground opening means and along said single common track, so that said fertilizer dispenser when attached to said seeder dispense fertilizer alongside growing plants as said wheel means is propelled alongside said plans, said mounting means comprising upper mounting means for removably attaching said fertilizer hopper to an upper portion of said frame, and lower mounting means for removably attaching said fertilizer hopper to said lower portion of said frame, and said upper mounting means including a pair of forwardly and downwardly extending spring clips extending forwardly from said fertilizer hopper and configured for lateral springout engagement with the interior surfaces of said upwardly extending frame-forming means when insertingly pressed therebetween, said clips having depending fingers configured to engage over said crossmember when pressed downward thereagainst.

5. The combination of claim 1 wherein said ground opening means is configured with an open rear area exposing the interior thereof, said seed directing means of the seeder includes a seed directing means which dispenses seeds within the interior of said ground opening means in a position where the open rear area of said ground opening means permits the seeds to be seen as they are dropping upon the ground, said fertilizer dispensing chute when the fertilizer dispenser is mounted upon said seeder dispensing the fertilizer also within the interior of said ground opening means, the open rear area thereof also enabling the fertilizer to be seen dropping upon the ground.

6. The combination of claim 5 wherein said ground opening means is configured so that the dug-up soil drops back into the furrow upon the seed or fertilizer dropped into the furrow, and said seed and fertilizer directing means being positioned to drop the seed and fertilizer immediately behind said grounding digging means.

7. The combination of claim 1 wherein said seed directing means includes a seed dispensing chute, a lower portion of said seed dispensing chute being open at the rear portion thereof so that the seeds dropping therefrom are visible from the rear thereof, and said lower portion of said seed dispensing chute configured for vertically sliding contacting engagement with interior walls of said ground opening means, said seeder includes means for adjustably locking said ground opening means to said seed dispensing chute at a chosen height with respect to the ground, and said fertilizer dispensing chute dispensing said fertilizer into said seed dispensing chute.

8. The combination of claim 4 wherein said seeder wheel means comprises only one front and one rear wheel aligned with said ground opening and said seed and fertilizer directing means.

9. The combination of claim 4 wherein said metering means comprises:
a metering slide slidably passable through an opening in a wall of said fertilizer dispensing chute to regulate the flow rate of fertilizer according to the degree of insertion thereof, said slide and the interior of said fertilizer dispensing chute configured so that full insertion of said slide completely cuts off the flow of fertilizer;
a rotatable actuating rod having a handle at an upper end thereof;
guide means for guiding said actuating rod and allowing the free rotation thereof by said handle;
means connecting said metering slide to the bottom of said rod for moving said metering slide to varying insertion depths into said fertilizer dispensing chute by rotation of said actuating rod;
and adjustable limit means on said lower mounting means for setting the maximum withdrawal of said metering slide to a given value so as to limit the maximum fertilizer flow rate to a chosen value.

10. The combination of claim 1 wherein said metering means comprises:
a metering slide slidably passable through an opening in a wall of said fertilizer dispensing chute to regulate the flow rate of fertilizer according to the degree of insertion thereof, said slide and the interior of said fertilizer dispensing chute configured so that full insertion of said slide completely cuts off the flow of fertilizer;
a rotatable actuating rod having a handle at an upper end thereof;
guide means on said lower mounting means for guiding said actuating rod and allowing the free rotation thereof by said handle;
means connecting said metering slide to the bottom of said rod for moving said metering slide to varying insertion depths into said fertilizer dispensing chute by rotation of said actuating rod;
and adjustable limit means for setting the maximum withdrawal of said metering slide to a given value so as to limit the maximum fertilizer flow rate to a chosen value.

11. The combination of claim 10 wherein said metering slide has a slot-formed hole, and said connecting means includes an offset extension of said actuating rod connected to said slide, said offset extension rotatably passing through said hole in said slide, so that rotation of said actuating rod causes translation of said slide to a chosen position.

12. The combination of claim 11 wherein the insertion end of said slide is configured with a blade-like knife like leading edge to break up fertilizer lumps and ensure proper shutoff of fertilizer flow when said slide is urged fully inward.

13. The combination of claim 11 wherein said limit means includes:
a limit plate movably affixed to said lower mounting means and having an elongated slot therein, said slot configured to insertively accept an intermediate portion of said offset extension so that free movement of said intermediate portion can occur along said slot as said actuating rod is rotated; and
clamping means for clamping said limit plate to a given position so that at a given partially withdrawn position of said slide said intermediate portion arrestingly engages one end of said slot to prevent further withdrawal of said slide.

14. A fertilizer dispenser for attachment to a seed dispenser having a frame with upper and lower portions, said seeder frame including a pair of laterally spaced upwardly extending frame-forming means having handle grips at their upper ends, and there being a crossmember below said handle grips; a seed hopper on said frame for holding a quantity of seed to be dispensed, wheel means attached to said lower portion of said frame for supporting said frame as it is pushed over the ground by an operator, ground opening means having ground digging means for opening a furrow in the ground, said ground opening means having adjustment means for setting the cutting depth of said ground opening means to a chosen value, and seed directing means for directing the flow of seed to the ground, said wheel means and said ground opening means disposed to traverse a single common track as said seeder is propelled over the ground, said seed directing means being configured and disposed to dispense seed behind said ground digging means, said fertilizer dispenser comprising: a fertilizer hopper for holding a quantity of fertilizer to be dispensed; a fertilizer dispensing chute; manually controllable metering means for regulating the rate of flow of said fertilizer out of said fertilizer dispensing chute; and mounting means for mounting said fertilizer dispenser on said frame of said seeder wherein said dispensing chute is disposed to dispense said fertilizer behind and in alignment with said ground digging means and along said single common track; said mounting means comprising upper mounting means for removably attaching said fertilizer hopper to an upper portion of said seeder frame, and lower mounting means for removably attaching said fertilizer hopper to a lower portion of said seeder frame, and one of said mounting means of said fertilizer dispenser including a pair of downwardly extending spring clips extending forwardly from a forward portion of said fertilizer hopper and configured for lateral springout engagement with the interior surfaces of said upwardly extending frame-forming means when insertingly pressed therebetween, said clips having depending fingers configured which engage over said cross-member when pressed downward and thereagainst.

15. The fertilizer dispenser of claim 14 for attachment to a seeder wherein said seeder frame includes a portion of said frame below said crossmember and including a laterally extending member; and said lower mounting means includes depending fingers for engaging over said laterally extending member.

* * * * *